United States Patent

Gibbs et al.

[11] 3,966,611
[45] June 29, 1976

[54] FILTER

[75] Inventors: Orville J. Gibbs, North Easton; John T. Roos, Westwood, both of Mass.

[73] Assignee: Bird Machine Company, Inc., South Walpole, Mass.

[22] Filed: Dec. 16, 1974

[21] Appl. No.: 533,340

[52] U.S. Cl. ............................ 210/203; 210/216; 210/328; 210/333 R; 210/393; 210/400
[51] Int. Cl.² ........................................ B01D 33/02
[58] Field of Search .................. 209/173, 454–457; 210/203, 271, 272, 273, 328, 330, 332, 338, 391, 393, 400, 216

[56] References Cited
UNITED STATES PATENTS

| | | | |
|---|---|---|---|
| 1,097,896 | 5/1914 | Trent | 210/328 |
| 1,668,557 | 5/1928 | Grondal | 210/328 X |
| 2,034,784 | 3/1936 | Wallny | 210/391 X |
| 2,677,467 | 5/1954 | Giorgini | 210/203 X |
| 3,216,576 | 11/1965 | Roos | 210/328 |
| 3,552,572 | 1/1971 | Lehmann | 210/271 |
| 3,830,658 | 8/1974 | Davister | 210/328 X |

OTHER PUBLICATIONS
Taggart, Handbook of Mineral Dressing, 1950, pp. 8–43 to 8–49 and 11–04 to 11–23.

*Primary Examiner*—Charles N. Hart
*Assistant Examiner*—Robert H. Spitzer
*Attorney, Agent, or Firm*—Edgar H. Kent

[57] ABSTRACT

In filters of the type in which a cake of solids deposited from a liquid slurry thereof on a generally horizontal filter medium is subjected to treatment involving passage of liquid through the cake while on the filter medium, means is provided for increasing the drainage rate of the formed cake by causing the cake to form on the medium from the slurry fed thereto by gravity settling in the liquor of the slurry and by removing liquor of the slurry from above the cake while the liquor still contains unsettled fine particles, such means including means providing a backflushing flow of liquid through the underside of the filter medium and the cake forming thereon into the slurry.

13 Claims, 11 Drawing Figures

FILTER

BACKGROUND OF THE INVENTION

1. Field of the Invention

This invention relates to a liquid-solids slurry filter, more particularly such a filter of the type wherein a cake of solids deposited from the slurry on the filter medium, is subjected to one or more treatments, such as washing, involving the passage of liquid through the cake while it is retained on the filter medium.

2. Description of the Prior Art

Filters of the type concerned are typified by so-called horizontal rotary pan filters and belt filters. Filters of the first type have a horizontally disposed, generally circular array of pans with filters at their bottoms. Slurry fed to each pan is formed into a cake on each bottom filter by suction applied thereunder, wash water is applied to the cake and drawn through it by suction, usually several times, and the washed cake is finally removed, either by tilting the pan to dump it, or by moving scrapers. The array of pans is usually rotated about a vertical axis past the various feed and treating stations (see e.g. U.S. Pat. No. 2,684,158), but the pans may be stationary and the feed and wash equipment rotated about such axis (see e.g. U.S. Pat. No. 2,687,806).

In belt filters an endless belt carries the slurry generally horizontally over suction boxes from a feed station past cake wash and drying treatment stations. The belt may carry pans with filter bottoms (see e.g. U.S. Pat. No. 2,677,467) or the belt may constitute or comprise the filter medium, being formed to contain the slurry and cake through the aforesaid stages as the belt passes over the vacuum pans, which may be stationary (see e.g. U.S. Pat. No. 2,034,784), or may reciprocate along the belt path (see e.g. U.S. Pat. No. 2,997,179).

In utilizing such filters with many types of slurries which contain both fine and coarse particles difficulty is experienced in forcing the wash water through the formed cake, even with strong suction force applied. Pretreating the slurry as in centrifugal equipment to remove unwanted fines or "slimes" alleviates the problem to some extent but not fully, and slow drainage rate of cakes continues to slow the processing and production rates as well as producing wetter cakes than desired.

SUMMARY OF THE INVENTION

In U.S. Pat. application of applicant herein Orville J. Gibbs, Ser. No. 533,338, filed contemporaneously herewith, there is disclosed an improvement of filters of the type concerned wherein cake forming and liquor removal means are provided that form the cake by gravity settling of solids in the liquor, and the liquor is removed from above the cake, rather than through the cake as is conventional, while the liquor still contains unsettled fine particles. The greatly increased cake drainage rates so obtained, apparently by inhibiting blanketing of the top surface of the cake with fine solids ("slimes"), provide important advantages of increased production rates and reduced costs.

The object of this invention is to improve the effectiveness of the means of the aforesaid application by the provision of additional means which is operative to increase the proportion of fine solids that are retained in the liquor at the time of its removal from above the cake.

It has been discovered that the object of this invention is achieved by the provision of means providing a backflow of liquid from under the filter medium through the medium and through the cake thereon, during the period of cake formation by gravity settling on the medium and before the liquor containing fines is removed.

In filters of the rotary horizontal pan type, the means of this invention fills the suction system under the bottom filter medium of each pan with liquid preliminary to the feed of slurry thereto, maintains a pressure of said liquid slightly above the hydrostatic head of feed slurry on the filter medium during the period of cake formation on the medium by settling of solids in the slurry liquor, and drains the liquid from the suction system after the slurry liquor with fine solids has been removed from above the cake in the pan. The liquid draining from a first following cake wash may be economically used for this purpose.

In belt filters the present invention substitutes for suction containers to which the underside of the filter media of the belt, or of pans carried by the belt, are normally exposed in the initial cake forming zone, containers maintained full of liquid which, between the slurry feed and removal of fines-containing liquor from above the cake, is maintained under pressure slightly above the hydrostatic head of the slurry on the belt.

As in the aforesaid patent application it is preferred to utilize a slurry liquor removal means which siphons the liquor off from adjacent the top of the cake and which, in the case of filters with a succession of individual filter pans, is movably mounted for insertion into and withdrawal from each pan.

The low pressure backflushing provided by the means of this invention functions to prevent the settling of fine solids in the slurry liquor onto the cake that would otherwise settle thereon during the period of cake formation, prior to liquor removal. The fine particles remain suspended in the liquor above a zone immediately over the cake face which is substantially clear backflushing liquid. Thus these fine particles are removed with the liquor and the cake has greater freedom from fine particles, more openness, and a greater increase in drainage rate than is obtained by the means of the aforesaid patent application without the means of the present invention.

BRIEF DESCRIPTION OF THE DRAWINGS

FIGS. 1 through 4 illustrate a horizontal rotary tilting pan filter, which, except for modifications hereinafter set forth, is of a conventional commercially available type such as shown in U.S. Pat. No. 2,684,158 aforesaid.

Figure 1:
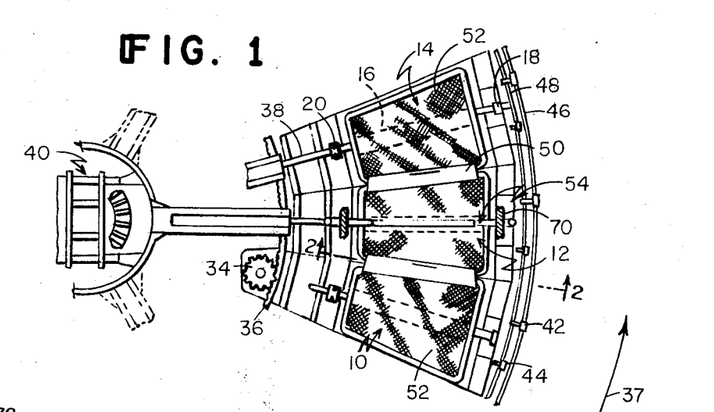
FIG. 1 is a partial plan view of a horizontal rotary pan filter of the tilting pan type, with structural changes according to the invention of the aforesaid patent application.
Figure 2:
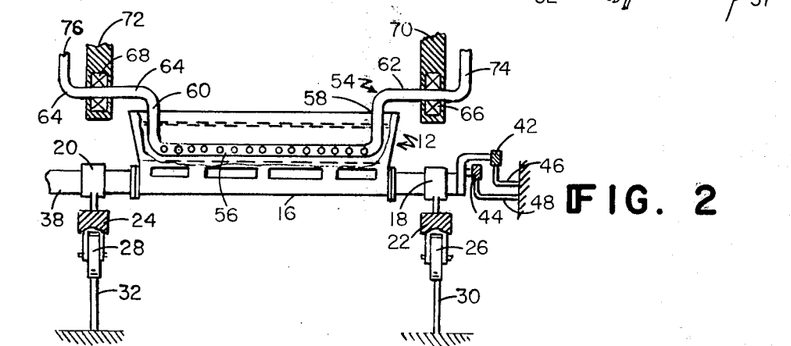
FIG. 2 is a vertical section view on line 2—2 of FIG. 1, broken away in part.

FIG. 1 shows only three of the circular array of filter pans of the filter, these being designated generally respectively 10, 12 and 14. The pans are each provided with a central drain pipe 16 at the bottom on which they are supported and which is rotatably mounted at its opposite ends in bearing sleeves 18 and 20. As shown in FIG. 2, sleeves 18 and 20 are supported on concentric support rings 22 and 24 having sets of wheels 26 and 28 mounted thereto by which they may be rotated about the central axis of the filter on concentric circular rails 30 and 32, respectively, fixed to underlying supporting structure. The cells are rotated about the filter axis in the direction of arrow 37 by motor-driven pinion 34 engaging circular rack 36 on the rotatable structure.

The pipes 16 are connected at their inner ends by flexible hoses 38 to a central valving control system 40, the outer part of which is connected to rotate with the pans about a stationary core. Each pan has fixed to the outer end of its pipe 16 a pair of cams 42 and 44 which ride on rails 46 and 48 attached to fixed structure such as posts surrounding the filter and which act on the cams to maintain the pans horizontal as in the positions shown in FIG. 1, and in other positions to turn pipes 16 to tip the pans as desired, including turning them upside down to dump the cake after washing has been completed. The structural arrangement of rails and cams to secure this action is well-known (see e.g. U.S. Pat. No. 3,389,800). The pans are oblong, larger at their outer than their inner ends and are provided with trailing sidewalls having turned over tops 50 which overlie the top of the leading sidewall of the next following pan to prevent spillage between the pans. They have filter media 52 secured to suitable supports (not shown) in their bottoms, the bottoms draining into pipes 16.

Control system 40 is arranged to connect hoses 38 to suction or to close them as desired. The pan 10 is assumed to be in a position following the feed position at which it has been charged with slurry by stationary feed means (not shown). At this position, as in the feed position and through the next following position in which pan 12 is shown, control system 40 would be normally arranged to connect the hoses 38 of pans 10 and 12 to a source of high vacuum or suction to drain off the liquor through the filter media and form the cake of extracted solids thereon. However, in accordance with the aforesaid patent application, vacuum is not applied in these positions wherein, according to the present invention, control means 40 causes the suction system under these pans to be filled with backflushing water under pressure by means hereinafter described. Hence in pans 10 and 12 the cake is forming on the filter media simply be settling of solids in their liquor and through the backflowing liquid. On the other hand, system 40 is arranged to apply suction to the hose 38 of pan 14, from which most of the liquor above the cake has been removed, while pan 14 was passing through the position of pan 12, by mechanism according to the aforesaid patent application now to be described, the remaining liquor in pan 14 thus being drawn off through the cake.

As best shown in FIG. 2, a generally U-shaped drain pipe designated generally 54 has an apertured base portion 56 slightly shorter than the pan length and end arms 58 and 60 extending substantially at right angles thereto which in turn have right angle extensions 62 and 64 rotatably received through bearings 66 and 68 in support arms 70 and 72 connected to fixed supporting structure (not shown) above the filter. Flexible hoses 74 and 76 connect drain pipe extensions 62 and 64 to a stationary source of suction, which may be controlled to open and close pipe 54 to suction in timed relation to the rotation of the filter. The location of bearings 66 and 68, which as shown are disposed centrally of the position of pan 12 in FIG. 1, and the length of pipe arms 58 and 60 are such that, in the position of the pans shown in FIGS. 1 and 2, base 56 of drain pipe 54 lies in the liquor of pan 12 with only small clearance above the solids cake on its filter medium, so that it draws off nearly all the liquor with suspended fine slow settling solids from above the cake.

Figure 3A:
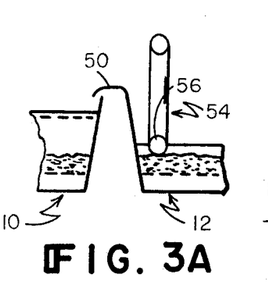
FIGS. 3A, 3B and 3C are diagrammatic views of portions of two of the pans of FIG. 1 at three different operating positions.
Figure 3B:
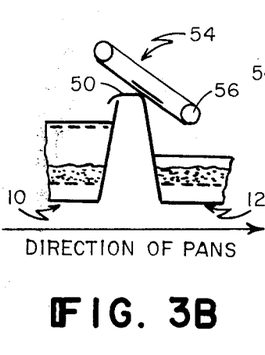
Figure 3C:
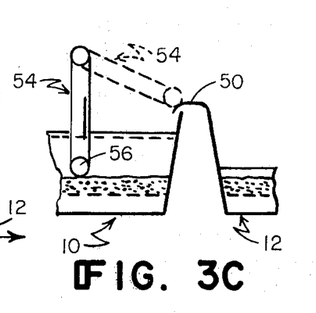

The flexibility of hoses 74 and 76 permits extensions 62 and 64 of suction pipe 54 to pivot in bearings 66 and 68 to effect insertion of pipe 54 in and its withdrawal from each pan. As shown, such pivoting is effected by the action of the trailing wall and its top 50 of each pan on pipe 54 as that wall is moved past the position of the pipe, this action being shown diagrammatically in FIGS. 3A, 3B and 3C. In FIG. 3A the pans have been rotated from their position of FIG. 1 so that drain pipe 54 is completing its drainage of liquor from above the cake in pan 12 and is about to contact the trailing sidewall of that pan. As shown in FIGS. 3B and 3C, continued rotation of the filter causes drain pipe 54 to be pivoted in the direction of filter rotation by engagement with the trailing wall of drained pan 12 (FIG. 3B) so that it rides over the top 50 of that wall (FIG. 3C, dotted lines) and then pivots under its weight in the opposite direction to drop into the drainage position in still full pan 10 (FIG. 3C, full lines).

While this action is taking place, the ports of the suction source connected to hoses 74 and 76 of drain pipe 54 may be automatically closed, as by cam action from the rotating filter structure. At the position of pan 12 in FIG. 3B, control system 40 applies suction to the hose 38 of pan 12 so that the small amount of liquor remaining is drawn off through the cake. As the pan moves on about the filter axis, washes are applied to and drained away through the cake, the cake is dumped, and the filter medium is washed, all as usual except that the utilization of the invention substantially reduces the time and space required for adequate cake drainage.

It will be appreciated that other means could be provided for alternately inserting the drain pipe 54 in, and removing it from, the pans. For example, cam action from the rotating filter, instead of actual contact with the pans, could be used to effect the pivoting shown, or such action could be used to operate a lift and drop mechanism to which the pipe is connected for opposite vertical movements to and from the pans. However, the arrangement shown is simple and satisfactory.

Figures 4, 5, 5A:
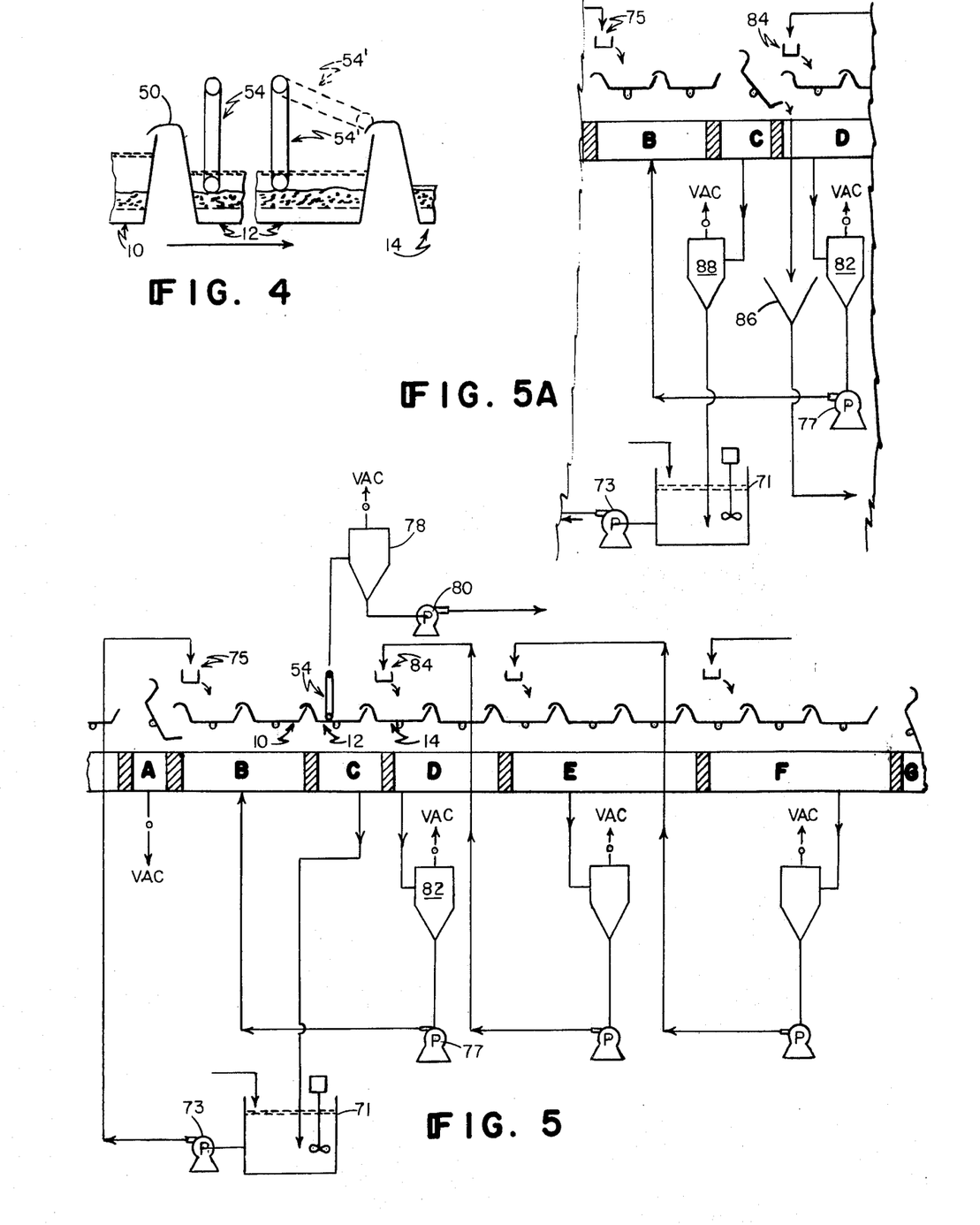
FIG. 4 is a diagrammatic view of portions of the pans of FIG. 1 at one of their operating positions, and illustrating a modification of certain mechanism of FIG. 1.
FIG. 5 is a diagrammatic layout of apparatus of the previous figures illustrating application of the means of the present invention thereto.
FIG. 5A is a modification of part of the diagram of FIG. 5.

Depending on the rate of rotation of the filter and the amount of liquor to be removed from each pan by drain pipe 54, more than one such pipe may be needed. FIG. 4 illustrates diagrammatically the addition of a second such drain pipe 54', which may be of like construction and have like suction connections to those of pipe 54. As shown, pipe 54' is so located that it pivots into a pan as the pipe 54, having partially drained the pan, is about to be pivoted out of it, the position of the pans indicated in FIG. 3A. Further such additional drain pipes could, of course, be provided if needed.

FIG. 5 shows diagrammatically the apparatus of FIGS. 1 and 2 in its various stages of operation with means for applying backflushing liquid thereto in accordance with this invention. These stages are indicated by the letters A to G and the positions of the pans at these stages and the various connections thereto are diagrammatically indicated. The rotation of the pans about the filter axis is assumed to be from left to right in the Figure.

In FIG. 5, at stage A the pan is being returned to horizontal position after dumping and washing at stage G and suction is applied thereto to reseat the filter medium by a connection labeled "VAC" to a source such as a vacuum pump (not indicated on the drawing). Tilting of the first pan to the left in stage B to horizontal has been completed and it is being charged with slurry from a source tank 71 via pump 73 and piping to feeder 75. The next three pans to the right are assumed to be the pans 10, 12 and 14 of FIG. 1 and are so indicated. As a pan moves into section B, its suction system is closed to vacuum and is charged with water to a pressure slightly above the hydrostatic pressure head of the feed in the pans in stage B, by pressure control pump 77 and connected piping indicated. It should be understood that all connections to the suction system of the pans, including that to the pump 77, are made through control system 40 and hoses 38.

The pans in stage B are therefore receiving a backflow of water through the filter media at their bottoms, and this continues in stage C where the liquor above the cake formed in pan 12 by settling as the pan moved through stages B and C is removed by suction drain pipe 54 connected to a vacuum receiver 78 with liquid discharge pump 80. As liquor removal from pan 12 nears completion, its suction system is drained to tank 71 as indicated by the arrowed line from stage C thereto. As pan 12 moves from stage C into stage D its suction system is opened to a vacuum receiver 82, the liquid outlet of which is connected to the suction side of pump 77. In stage D, pan 12 will receive the first cake wash from wash feeder 84 which is just completing its wash water feed to pan 14. Hence, it is the drainage from this first wash that is used to provide the backflushing liquid via receiver 82 and pump 77. This arrangement is economical in that the first wash water drainage is normally returned to the slurry tank 71. Hence additional water is not required for backflushing, except that a small amount of makeup water may need to be added from time to time.

The remainder of the operation is conventional. In stage E the pans receive a second application of wash water which is drained through the pans to a second vacuum receiver, the liquid discharge whereof is pumped to supply the wash to the preceding feeder 84. In stage F this procedure is repeated in a third wash. In stage G the pan is dumped, with its suction system normally connected to blow-back air pressure.

FIG. 5A shows changes at stage C of FIG. 5 where, instead of utilizing suction pipe 54, the liquor from the pan in the position of pan 12 of FIG. 5 is removed by tilting the pan (by suitable change in rails 46 and 48 opposite this stage), in accordance with a modification disclosed in the aforesaid patent application. In FIG. 5A the pan in the C stage, with suction pipe 54 omitted, is shown tilted to dump the liquor above the cake into a trough 86 for disposal, replacing receiver 78 and pump 80 in FIG. 5. The drainage line from the suction system of this pan to tank 71 includes a vacuum receiver 88 which may apply a low suction to hold the cake in place during tilting if needed. After tilting, the pan is restored to horizontal position by the time it enters stage D.

It will be appreciated that FIGS. 5 and 5A can apply unchanged to a filter of the type in which the pans are stationary and the slurry and wash feed devices are rotated (to the left in these Figures), the pans representing the various stages in the cycling of each pan.

FIGS. 5 and 5A can also be taken as illustrative of application of the invention of the aforesaid patent application to a belt filter with individual pans. In such filters, the pans are normally carried in a straight, substantially horizontal path through stages B to F over suction containers to which the undersides of filter media in the pan bottoms are exposed. The liquor can be removed from above the cake by means 54 as in FIG. 5 or by tilting the pan as in FIG. 5A. In applying the present invention to such a filter, pump 77 will maintain the containers in stage B full of liquid under a constant pressure above the hydrostatic head in the pans, and in this case the liquid does not need to be drained. Consequently, pump 77 is better connected to a source of cleaner liquid than the first wash drainage from vacuum receiver 82, and the drain line from stage C is eliminated.

The pans should remain in stage B long enough for the desired, more readily settling solids to settle through the liquor and backflushing liquid to form the cake. This time will vary somewhat, depending on the particular nature of the slurry being processed, and can readily be determined. With phosphate rock slurry about 10 to 15 seconds is usually sufficient. The provision of backflushing according to this invention does not add significantly to the time required but does permit longer settling time without significant fines accumulation on the cake.

Figure 6:
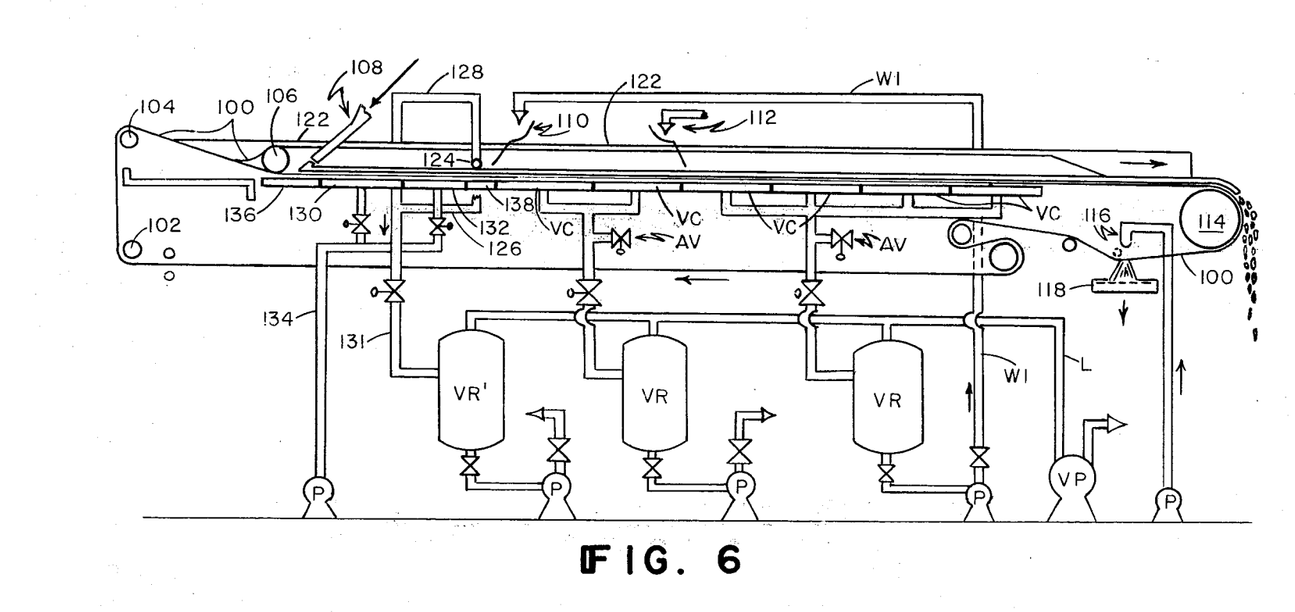
FIG. 6 is a partial schematic view of a belt filter with structural changes according to the aforesaid patent application and to the present invention.
Figures 7, 8:
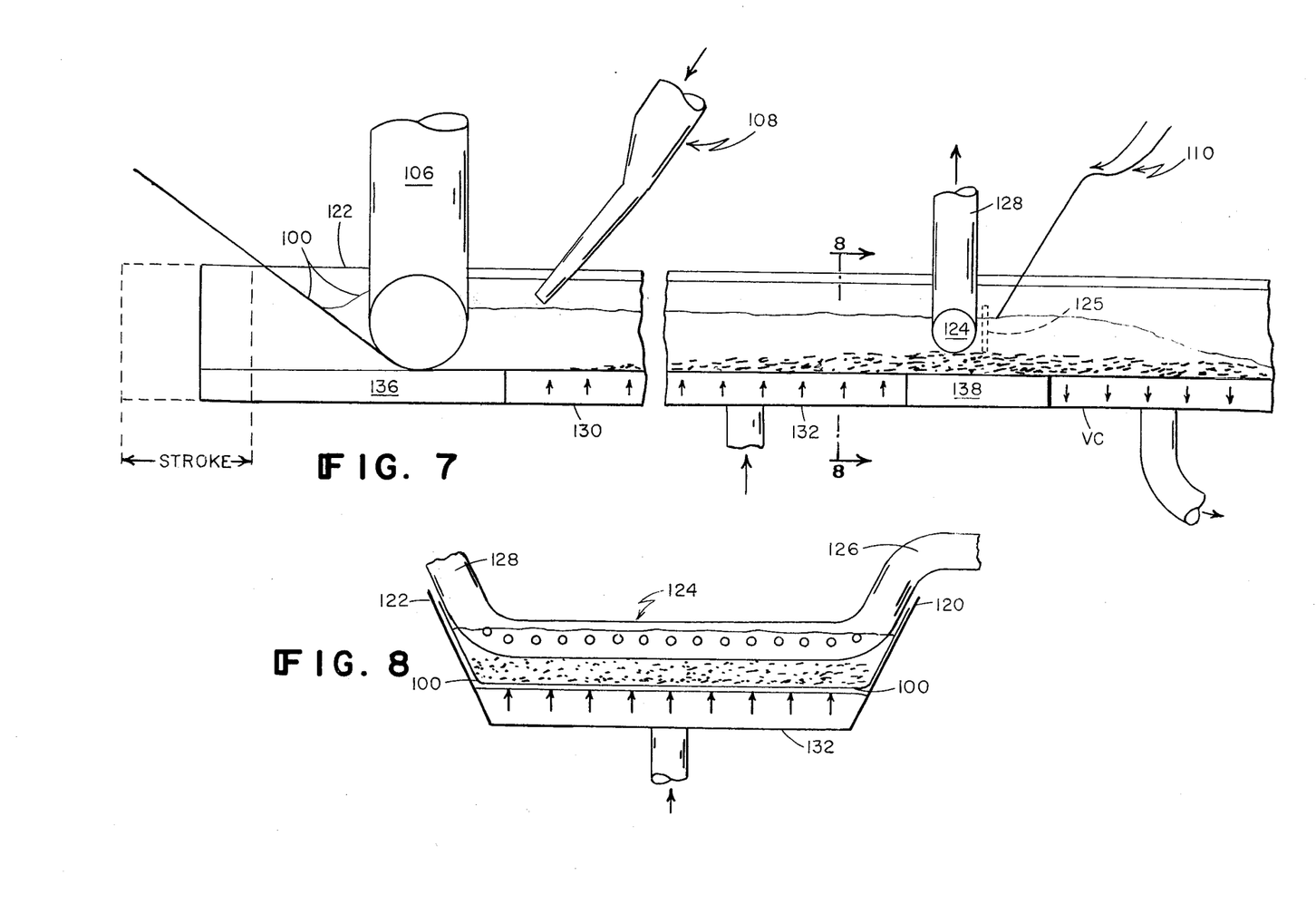
FIG. 7 is a diagrammatic view in longitudinal section of a portion of the apparatus of FIG. 6.
FIG. 8 is a diagrammatic cross-section view on line 8—8 of FIG. 7.

FIGS. 6 to 8 illustrate schematically application of the invention of the aforesaid patent application and of the present invention to a belt filter of the type in which the cake is formed directly on a traveling filter belt, the belt being formed into a container during those stages in which slurry is being fed thereto and the cake is being treated with wash water.

In FIG. 6 the belt 100, usually a composite of a filter cloth and a supporting apertured belt, is driven over rollers 102 and 104 at the lefthand end of the drawing, under a forming bar 106 and a slurry feed fishtail 108, under first and second wash water applying devices indicated symbolically at 110 and 112, respectively, over a drum 114 at the righthand end of the drawing where the cake is scraped off as indicated, past a washing spray header 116 and collecting pan 118 where the belt is washed through its underside, and over intermediate tension rollers back to the roll 102.

During its passage through the cake washing and draining stages the belt rides over supporting and liquid receiving suction compartments designated VC, provided with apertured top plates and connected at their bottoms by valved pipelines going to receivers designated VR, from the bottoms of which the water is extracted by pumps designated P and from the tops of which air is evacuated to maintain desired suction by a pump designated VP, to the suction side of which they are connected in series by a common pipeline L. A valved air vent designated AV is provided in the line from each compartment VC to its receiver VR. Countercurrent washing is provided by recycling the wash water from the second wash to the first wash applying mechanism through a pipeline designated W1.

From the area of bar 106 to the vicinity of drum 114, continuous sidewalls are provided designated 120 and 122 (see FIG. 8) and which may be integral with compartments VC. Forming bar 106 acts to turn the sides of the belt 100 up against sidewalls 120 and 122 to form the sides of a container, the initial or lefthand end of which is formed by bar 106. The far end of the container is formed by providing the belt path toward drum 114 with a slight upward tilt.

As so far described, the apparatus of FIG. 6 is conventional. The compartments under the belt may be stationary at least longitudinally of the belt, as in some commercially available filters of this type. However, the apparatus shown in FIG. 6 is of a different commercially available form in which all the compartments are driven in a cycle, in which they move in the direction of belt travel at the speed of the belt and are then returned to starting position at a faster speed and while suction connections thereto are closed (see e.g. U.S. Pat. No. 2,997,179). The pan drive for this cycle may be, for example, a pneumatic motor (not indicated in the drawings).

In accordance with the invention of the aforesaid patent application, a perforated drain pipe 124 is stationarily mounted to extend across the channel between walls 120 and 122 for substantially the full width of the channel at a slight level above the cake formed on the belt before it reaches the pipe. Pipe 124 is located a sufficient distance beyond the slurry feed point to permit desired cake formation by settling as explained previously herein. The opposite ends of pipe 124 are connected by pipes 126 and 128 to valved pipe 131 connected to a suction receiver VR'. The liquor drained thereto from pipe 124 is extracted from the bottom of receiver VR' by a pump P and suction is applied thereto by a connection at the top to line L from the suction side of pump VP.

Pipe 124 forms a dam for the liquor above the cake so that a pool of such liquor is formed between pipe 124, sidewalls 120 and 122 and forming bar 106. Pipe 124 is located just ahead of the point of first wash application through 110, this tending to equalize the hydraulic pressure at opposite sides of pipe 124 and to prevent short circuiting of liquor under the pipe 124. It may be desirable to provide, as a supplementary dam, a thin flexible strip such as rubber, indicated by dash lines at 125 in FIG. 7, extending between sidewalls 120 and 122 and between pipe 124 and wash feeder 110 from above liquid level to a position just clearing or wiping the upper surface of the cake.

In the conventional construction, suction compartments VC connected to a receiver VR are provided below the belt in the zone occupied by the aforesaid pool. In the present construction, in accordance with the present invention there are provided two compartments 130 and 132 which have valved connections at their bottoms to a pipe 134 through which water under pressure is supplied by a pump P, and two "blank" sections 136 and 138. Section 136 precedes compartment 130 in the direction of belt travel while section 138 extends between container 132 and the first suction compartment VC. Sections 136 and 138 are provided with closed tops; whereas, compartments 130 and 132 have perforated tops like the suction compartments VC so that water under pressure received therein will flow upwardly through belt 100 and the solids cake forming thereon, as indicated by the upwardly directed arrows in these compartments.

In operation, the compartments VC, 130 and 132 and sections 136, 138 are reciprocated longitudinally of the belt path, the stroke length being indicated by dotted lines at the left in FIG. 7, with the stroke in the forward direction of belt travel about two-thirds completed. In this direction of stroke, suction is applied to compartments VC and water under pressure is applied to compartments 130 and 132, as indicated by the arrows therein in FIG. 7. During the return stroke, the valves in the suction lines to compartments VC are closed to prevent adherence of the belt to their tops due to suction. It may also be desirable to close the valve in line 134 to compartments 130 and 132 during this period, although this is not needed so far as concerns adherence of the belt thereto.

It will be noted that blank section 138 is slightly wider than the length of the stroke, and is positioned so that at the end of the reverse stroke, the first suction compartment VC is spaced beyond pipe 124 in the direction of belt travel. This inhibits short circuiting of liquor under pipe 124 into this suction compartment at the start of the forward stroke, under the influence of the suction then applied to that compartment. Section 138 is also sufficiently wide to prevent short circuiting of liquid from compartment 132 into the first compartment VC. Section 136 prevents liquid flow through the belt area it underlies during the stroke in both directions, as does section 138.

As with the previously described embodiments, more than one suction pipe 124 may be utilized, which may be in series located at the same level or at different levels, or may be located one on the other at different levels. In filters of the type shown in FIGS. 6 to 8 in which the container system under the belts is not moved longitudinally of the belt, section 138 can be of considerably reduced width and section 136 can be eliminated.

As the belt moves from the slurry feed means 108 to suction pipe 124, the faster settling solids settle out in the pool between bar 106 and pipe 124 while the slower settling fine solids remain in suspension in the liquor with the assistance of backflow of liquid through the belt and cake, so that they are withdrawn with the liquor above the cake by suction pipe 124, as in the embodiments previously described.

The operating stages and connections of a filter according to FIGS. 6 to 8 can be like those shown in stages B through E of FIG. 5 but with the endless belt replacing the pans, the pan connections of FIG. 5 being made to containers under the belt, the drainage line from stage C being omitted, pump 77 being connected also to stage C and to a different liquid source than the receiver 82, and means 54 and 84 being replaced by means 124 and 110 arranged as shown in FIG. 6. In moving from stage E back to stage B the cake would be scraped from the belt and the belt washed as in FIG. 6.

Tests have demonstrated that, by combining a backflushing system as disclosed herein with means providing the cake formation by settling and removal of fines-containing liquor from above the cake, the efficiency of the latter is substantially increased. For example, with backflushing included, cakes formed from phosphate rock slurry that had not been pretreated to remove slimes had increased drainage rates at least as great as cakes of like thickness produced by the means of the aforesaid patent application without backflushing from such slurry that had been pre-deslimed, and hence contained a much lower proportion of slimes, such increased drainage rates being several times those of cakes of like thickness formed from the pre-deslimed slurry in the conventional manner by suction under the filter medium. Thus it should become possible to eliminate costly pre-desliming operations, at least with backflushing included.

As noted in the aforesaid patent application, the suction pipes 54 and 124 should have inlets close to the top of the cake, as fines removal tends to decrease the amount of fines removed with the liquor. The backflushing pressure should be low, for example, such as to provide a pressure of two to six inches of water above the hydrostatic head of slurry over the cake being backwashed.

The aforesaid patent application discloses that the means thereof can be applied to a rotary table filter, for example such as disclosed in U.S. Pat. No. 3,262,574. Such a filter is similar to the filter of FIGS. 6 to 8 in that the table top comprises a filter medium between inner and outer circumferential walls on which the cake is formed from slurry fed thereto and the cake is washed and subjected to suction as the table top moves horizontally under slurry and wash water feed devices and over suction compartments, but the table top is rotated about a vertical axis. Backflushing means according to this invention may also be readily applied to such a table filter.

Thus compartments may be provided under the table top in the area between slurry feed thereto and liquor removal from above the cake, which are maintained filled with backflushing liquid under appropriate pressure in like manner to compartments 130 and 132 of FIG. 6. Liquor removal may be by a suction pipe such as 124 fixedly mounted closely above the table top extending across the table between the inner and outer circumferential walls forming a dam for a pool of slurry, as in FIGS. 6–8. Liquor removal from such a table may also be effected by forming the upper part of its outer circumferential wall portion as a belt which is moved away in the liquor removal area to permit the liquor above the cake to flow off the table, a slurry pool forming dam being provided between this area and the slurry feed point.

I claim:

1. In a filter for solids-liquid slurry of the type which includes feed means for feeding the slurry into a plurality of individual pans containing a filter medium while the pans are in substantially horizontal position, suction means for removing liquid through said medium in said pans, cake treating means for applying treating liquid to a cake of solids formed on said medium in said pans, and moving means for relatively moving said pans and the aforesaid means to subject said pans successively to the action of said feed means and said suction means and of said treating means and said suction means;

the improvement for treating slurry containing solids particles of which a portion of relatively fine size settles more slowly in the slurry liquor under the force of gravity than the remainder, which comprises the combination of:

means operative upon feeding of slurry to each pan and prior to the action of said suction and cake treating means thereon to inhibit drainage of slurry liquor through said medium in said pan for a time interval sufficient to permit a cake of solids to form on said medium by settling in said liquor, including backflushing means for supplying liquid to the under surface of said filter medium, while said cake is forming by settling in said liquor, at a pressure sufficiently above the hydrostatic head of slurry in said pan over said medium to cause said liquid to flow upwardly through said medium and cake forming thereon; and removal means operative prior to the action of said suction and cake treating means on each pan to remove slurry liquor from above the so-formed cake therein while said liquor contains unsettled particles of said relatively fine size portion.

2. A filter according to claim 1 wherein said pressure is of the order of two to six inches of water above said hydrostatic head.

3. A filter according to claim 1 wherein said removal means is arranged to remove said liquor from adjacent the upper surface of said cake.

4. A filter according to claim 1 wherein said removal means comprises a suction pipe with an inlet arranged to be disposed in a position with said inlet above and adjacent the level of cake to be formed on said medium in said pans, and means for alternately inserting said pipe to, and withdrawing it from, said position in said pans.

5. A filter according to claim 1 wherein said removal means comprises means for tilting said pans to pour said liquor off said cake.

6. A filter according to claim 1 wherein compartment means are provided beneath and exposed to said filter medium in each of said pans, and said backflushing means supplies liquid to the underside of said filter medium through said compartment means.

7. A filter according to claim 6 wherein individual said compartment means are mounted on each said pan and said backflushing means includes means for draining the liquid from said compartment means of each pan upon completion of backflushing therein.

8. In a filter for solids-liquid slurry of the type which includes feed means for feeding the slurry onto an endless filter medium while the medium is in substantially horizontal position, suction means for removing liquid through said medium, cake treating means for applying treating liquid to a cake of solids formed on said medium, and moving means for relatively moving said medium and the aforesaid means to subject said medium successively to the action of said feed means and said suction means and of said treating means and said suction means;

the improvement for treating slurry containing solids particles of which a portion of relatively fine size settles more slowly in the slurry liquor under the force of gravity than the remainder, which comprises the combination of:

means operative upon feeding of slurry to said medium and prior to the action of said suction and cake treating means to inhibit drainage of slurry liquor through said medium for a time interval sufficient to permit a cake of solids to form on said medium by settling in said liquor, including backflushing means for supplying liquid to the under surface of said filter medium, while said cake is forming by settling in said liquor, at a pressure sufficiently above the hydrostatic head of slurry over said medium to cause said liquid to flow upwardly through said medium and cake forming thereon; and removal means operative prior to the action of said suction and cake treating means to remove slurry liquor from above the so-formed cake while said liquor contains unsettled particles of said relatively fine size portion.

9. A filter according to claim 8 which includes container means comprising inpervious sidewalls having sealing engagement with opposite sides of said medium, and said removal means comprises siphon means extending between said sidewalls with an inlet disposed above and adjacent the level of cake to be formed on said medium, said feed means is arranged to feed said slurry to said medium between said sidewalls, said moving means moves said medium in the direction from said feed means to said removal means, and said backflushing means includes compartment means under and exposed to said medium between said feed means and said removal means.

10. A filter according to claim 9 wherein said removal means defines an end portion of a pool of slurry on said medium, and said cake treating means includes means for supplying liquid to the cake on said medium at the side of said removal means opposite said pool.

11. A filter according to claim 9 wherein said filter medium is a belt.

12. A filter according to claim 11 wherein said suction means also includes compartment means under and exposed to said belt after said belt passes said removal means, and all said compartment means are arranged for reciprocation longitudinally of the belt path.

13. A filter according to claim 8 wherein said removal means is arranged to remove said liquor from adjacent the upper surface of said cake.

* * * * *